March 28, 1967 A. SAMMS 3,310,938
ROCKET MOTOR FUEL FEED
Filed Oct. 7, 1964

INVENTOR.
Adolphus Samms
BY: Harry M. Saragovitz,
Edward J. Kelly &
Herbert Berl 3,310,938
ROCKET MOTOR FUEL FEED
Adolphus Samms, Box 3377, Yuma Proving Ground,
Yuma, Ariz. 85364
Filed Oct. 7, 1964, Ser. No. 402,362
2 Claims. (Cl. 60—39.48)

The invention described herein may be manufactured and used by or for the Government for governmental purposes, without the payment to me of any royalty thereon.

This invention relates to a rocket motor fuel feed and more particularly to a device for pressurizing the fuel tanks within liquid fuel propulsion units.

At present, pressurized fuel feeding in rocketry requires heavy fuel tanks, a turbine, fuel and oxidizer pumps. This equipment is expensive and complicated and also adds greatly to the weight of the rocket.

It is therefore a primary object of this invention to simplify the fuel feed system in a rocket by eliminating the turbine, fuel pumps and heavy tanks.

Another object is to eliminate turbopumps in a rocket by placing a steam generator in the fuel tank to supply steam for pressurizing the fuel therein.

It is a further object to generate steam in a steam generator by spraying pressurized hydrogen peroxide over catalyst pellets.

A final object of this invention is to prevent sloshing of the fuel in the fuel tanks of a rocket when in flight.

Figure 1:
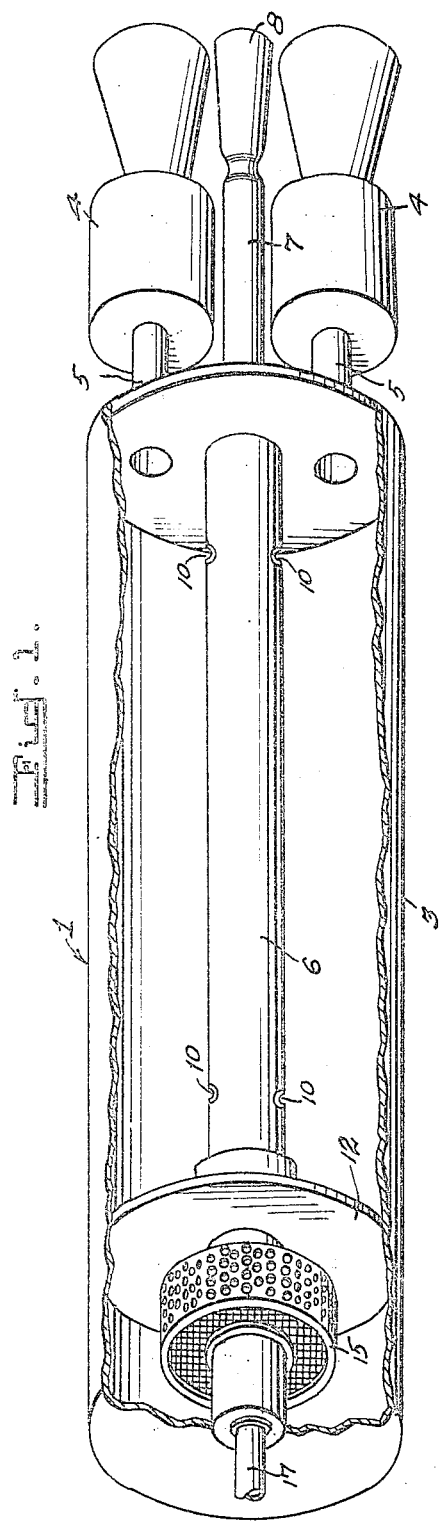
Figure 2:
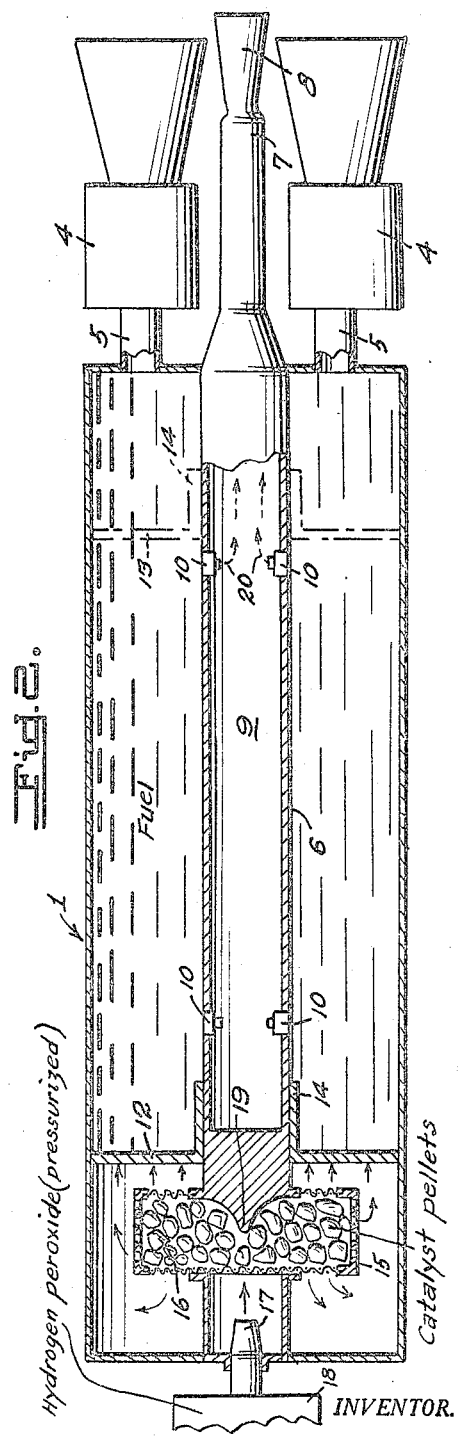

The specific nature of the invention as well as other objects and advantages thereof, will clearly appear from a description of a preferred embodiment as shown in the accompanying drawing in which:

FIG. 1 is a somewhat schematic perspective view of the rocket motor feeding device of the invention, parts being broken away to show the mechanism for pressurizing the fuel; and, FIG. 2 is an axial section of the feeding device.

Referring more particularly to the drawing, reference character 1 designates the rocket motor feeding device generally.

A fuel tank 3 may contain fuel or oxidizer. One tank only is shown, since where two tanks are used, the pressurizing mechanism is of course, duplicated.

The fuel, or oxidizer, is fed to rocket motors 4 through lines 5.

A shaft 6 is mounted axially in tank 3 and extends beyond tank 3 as at 7 to terminate rearwardly in a nozzle 8.

Shaft 6 is generally hollow as shown, and forms a passageway 9 which is provided with relief valves 10 which are shown schematically.

A plate 12, having an axial, integral collar 14 is slidably mounted on shaft 6. Means (not shown) may be provided for fluid tight sealing between plate 12 and the interior surface of tank 3 and the interior surface of collar 14 and the outer surface of shaft 6. The aforesaid means may be piston rings, packing, etc.

Means for generating steam to move plate 12 rearwardly to pressurize the fuel is provided and consists of a cage 15 carried on shaft 6 and disposed within tank 3. This cage may be of wire or perforated metal and is filled with catalyst pellets 16.

Operation

When the firing command switch is actuated (not shown) to launch the rocket, mechanism, such as solenoid valves (not shown) will release pressurized hydrogen peroxide from a tank 18 which is sprayed on pellets 16 through a nozzle 17 in shaft 6. A baffle 19 in shaft 6 diffuses the hydrogen peroxide over catalyst pellets 16 whereupon the steam generated thereby will flow out of the cage 15 and impinge upon the plate 12.

Plate 12 will be pushed down along shaft 6 as indicated by broken lines 13 to pressurize and force the fuel in tank 3 through lines 5 and to rocket motors 4.

Thus, a continuous supply of fuel is fed to motors 4.

Should, at any time, the steam pressure build up too fast, it will be released by relief valves 10 whereupon it will flow into passageway 9 as indicated by broken arrows 20.

Also the steam will pass into passageway 9 when all the fuel in tank is exhausted, thus preventing blow-up of the empty tank.

The steam pressure plate 12 pressing on the fuel in tank 3 holds the fuel in place, thus preventing sloshing when the rocket is in flight. This is a much more effective method then providing anti-slosh baffles in the tank as are presently in use. Thus even less weight is afforded the rocket.

It is apparent that a rocket motor fuel feed means has been devised that will effect a more efficient and less costly fuel feeding system for a rocket and one that eliminates complicated and heavy pumps.

Variations and modifications may be effected without departing from the scope of the novel concept of the present invention as set forth in the appended claims.

What is claimed is:

1. A rocket motor fuel feed including in combination, a rocket motor, a fuel tank in fluid connection with said rocket motor, there being a supply of liquid fuel in said fuel tank, a shaft axially secured in said fuel tank and extending rearwardly from said fuel tank, there being a passageway in said shaft and through its rearward end, a steam generator mounted on said shaft, a plate slidably mounted on said shaft and adapted to pressurize said fuel in said tank when steam generated by said generator impinges thereon and a series of relief valves in said shaft whereby excessive steam pressure in said fuel tank is relieved through said passageway.

2. A rocket motor fuel feed including in combination, a rocket motor, a tank in fluid connection with said rocket motor, said tank having a fuel area and a compression area, a shaft axially secured in said tank, there being a passageway in said shaft and through its rearward end, a plate slidably mounted on said shaft and separating said fuel area from said compression area, a steam generator beyond said plate in said compression area whereby steam generated thereby will impinge on said plate to pressurize a fuel when in said fuel area and a series of relief valves in said shaft whereby excessive steam pressure in said tank will be relieved through said passageways.

References Cited by the Examiner
UNITED STATES PATENTS 2,918,791   12/1959   Greiner _____ 60—39.48
3,138,929   6/1964    Schatz _____ 60—39.48
3,170,290   2/1965    Webb _____ 60—39.48

MARK NEWMAN, Primary Examiner.

D. HART, Assistant Examiner.